United States Patent
Wang et al.

[19]

[11] Patent Number: 6,136,158
[45] Date of Patent: *Oct. 24, 2000

[54] NO$_X$ REDUCTION METHOD IN CORONA DISCHARGE POLLUTANT DESTRUCTION APPARATUS

[75] Inventors: John H. S. Wang, Rancho Palos Verdes; Nelson William Sorbo, Redondo Beach; Weldon S. Williamson, Malibu; Edward J. Palen, Marina Del Rey, all of Calif.

[73] Assignee: Raytheon Company, Lexington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/697,043

[22] Filed: Aug. 19, 1996

[51] Int. Cl.[7] ....................................... B01J 19/08

[52] U.S. Cl. ............................................. 204/177; 588/427

[58] Field of Search .................................... 204/177, 179; 588/427

[56] References Cited

FOREIGN PATENT DOCUMENTS

578863 A1   1/1994   European Pat. Off. ............... 204/177

*Primary Examiner*—Kishor Mayekar
*Attorney, Agent, or Firm*—Colin M. Raufer; Leonard A. Alkov; Glenn H. Lenzen, Jr.

[57] ABSTRACT

Providing triatomic nitrogen ($N_3$) as a relaxation species to an exhaust gas that includes nitrogen oxide compounds ($NO_x$) increases the rate of reducing $NO_x$ in a corona discharge apparatus.

12 Claims, 1 Drawing Sheet

$NO_x$ REDUCTION METHOD IN CORONA DISCHARGE POLLUTANT DESTRUCTION APPARATUS

BACKGROUND OF THE INVENTION

1. Field of the Invention

This invention relates to the destruction of nitrogen oxide ($NO_x$) compounds in a corona discharge pollutant destruction apparatus.

2. Description of the Related Art

Passing a pollutant bearing gas through a corona discharge site is a known method of removing the pollutants from the gas. A general review of this technique is provided in Puchkarev et al., "Toxic Gas Decomposition by Surface Discharge," *Proceedings of the* 1994 *International Conf. on Plasma Science,* Jun. 6–8, 1994, Santa Fe, N. Mex., paper No. 1E6, page 88. Corona pollutant destruction has also been proposed for liquids, as disclosed in application Ser. No. 08/295,959, filed Aug. 25, 1994, now U.S. Pat. No. 5,549,795, "Corona Source for Producing Corona Discharge and Fluid Waste Treatment with Corona Discharge," and assigned to Hughes Aircraft Company, now doing business as Hughes Electronics.

In one system, described in Yamamoto et al., "Decomposition of Volatile Organic Compounds by a Packed Bed Reactor and a Pulsed-Corona Plasma Reactor," *Non-Thermal Plasma Techniques for Pollution Control,* NATO ASI Series Vol. G34 Part B, Ed. by B. M. Penetrante and S. E. Schultheis, Springer-Verlag Berlin Heidelberg, 1993, pages 87–89, brief high voltage pulses of about 120–130 nanoseconds duration are applied to the center conductor of a coaxial corona reactor through which gas is flowing. Each pulse produces a corona discharge that emanates from the center wire and floods the inside volume of the reactor with energetic electrons at about 5–10 keV. A similar system is described in U.S. Pat. No. 4,695,358, in which pulses of positive DC voltage are superimposed upon a DC bias voltage to generate a streamer corona for removing $SO_x$ and $NO_x$ from a gas stream. These processes have relatively poor energy efficiencies. With the reactor geometries that have been selected, it is necessary to deliver very short pulses to avoid arc breakdown between the electrodes, and consequent damage. The pulse-forming circuit loses approximately half of the power coming from a high voltage supply in a charging resistor, and additional energy is wasted in a double spark gap. Furthermore, the capacitive load of the coaxial corona reactor must be charged; this charging energy is typically much greater than the energy that is actually used in the corona reaction, and simply decays away into heat after each pulse without contributing to the pollutant destruction.

A similar approach, but with a different reactor geometry, is taken in Rosocha et al., "Treatment of Hazardous Organic Wastes Using Silent-Discharge Plasmas," *Non-Thermal Plasma Techniques for Pollution Control,* NATO ASI Series Vol. G34 Part B, Ed. by B. M. Penetrante and S. E. Schultheis, Springer-Verlag Berlin Heidelberg, 1993, pages 79–80, in which the corona discharge is established between parallel plates. This system also suffers from a poor specific energy due to inefficient pulse formation and non-recovery of reactor charging energy.

A block diagram of a generic single-stage corona discharge pollutant destruction apparatus is shown in FIG. 1. A corona discharge reactor 2 takes pollutant-bearing exhaust gas 12 from an engine 6 through an inlet conduit 8, treats the exhaust gas, and discharges the treated exhaust gas 14 through an outlet conduit 10. Major pollutants in the exhaust gas 12 from the engine 6 include various forms of nitrogen oxides ($NO_x$), hydrocarbons (HC), and carbon monoxide (CO). HC and CO are considered high energy level pollutants, which can be oxidized to produce water ($H_2O$) and carbon dioxide ($CO_2$). $NO_x$ compounds are considered low energy level pollutants, and need to absorb energy to be reduced to harmless diatomic nitrogen ($N_2$) and oxygen ($O_2$). When a power source 4 supplies high voltage pulses to the corona discharge reactor 2, HCs are oxidized to become $H_2O$ and $CO_2$, while CO is oxidized to become $CO_2$. At each voltage peak, corona charges are emitted within the reactor 2, producing free radicals that oxidize HC to generate $CO_2$ and $H_2O$ and CO to generate $CO_2$. In general, high voltage pulses are very effective in destroying HC and CO, but have not been shown to be effective in the reduction of $NO_x$ into $N_2$ and $O_2$. Experiments have shown that corona generation using high voltages (up to 12 kV) may even produce some additional $NO_x$. On the other hand, low voltage pulses are highly efficient in reducing $NO_x$, but are very poor at oxidizing HC. The corona discharge process has achieved limited success in destroying $NO_x$, which include NO and $NO_2$, in the presence of oxygen and water. A problem with corona discharge is that it produces a strong oxidizing atmosphere by generating ozone ($O_3$) and radicals such as O and OH. The free radicals and $O_3$ are highly reactive oxidizers and react with both NO and $N_2$ to produce $NO_2$.

Injection of either hydrocarbon additives or ammonia ($NH_3$) is a known method for substantial reduction of $NO_x$ compounds in corona discharge reactors. A general review of injecting $NH_3$ or hydrocarbon additives is provided in G. E. Vogtlin and B. M. Penetrante, "Pulsed Corona Discharge for Removal of $NO_x$ from Flue Gas," *Non-Thermal Plasma Techniques for Pollution Control,* NATO ASI Series Vol. G34, Part B, page 187, 1993. If $NH_3$ is injected, it reacts with acids formed in the reactor to produce ammonia salts, which are then collected by either a filtration system or other particulate removal system. A disadvantage of this method is that accumulated solid ammonia salts must be removed periodically, and thus is inconvenient for automotive applications. Reduction of $NO_x$ by adding $NH_3$ in a corona discharge reactor has been achieved only at stationary source combustion sites. $NH_3$ has not been used for $NO_x$ reduction in the treatment of automobile internal combustion engine exhaust because of hardware manufacturing and operating cost. Injection of hydrocarbon additives has been shown to be effective by recycling the hydroxyl radicals (OH) during the oxidation and reduction of NO. The efficiency of OH radical recycling is dependent on the reaction rate of the hydrocarbon additive with the OH radicals, and is described in G. E. Vogtlin et al.

The injection of engine oil in a plasma reactor to treat diesel engine exhaust is described in M. Higashi et al., "Soot Elimination and $NO_x$ and $SO_x$ Reduction in Diesel-Engine Exhaust by a Combination of Discharge Plasma and Oil Dynamics," *IEEE Transaction on Plasma Science,* Vol. 20, No. 1, 1992. The article reported the removal of $NO_x$ from diesel engine exhaust by the use of a discharge plasma in a reactor injected with drops of engine oil. Once the engine oil is in the chamber, the plasma generates a fine oil mist which stimulates the reduction of soot as well as $NO_x$ and $SO_x$ compounds.

SUMMARY OF THE INVENTION

The present invention provides a method for reducing $NO_x$ by using a relaxation species, which can be produced in a corona discharge reactor by applying selective frequency photonic discharge and/or selective potential corona discharge to a combustion exhaust gas mixture, with or without additional gases.

The relaxation species is capable of removing the reactive excitation energy within the nitrogen species, including N, NO, NO*, $NO_2$, $N_2O$, $NO_3$, $N_2O_5$, $HNO_2$, $HNO_3$, $HO_2NO_2$, RONO and $RONO_2$. The asterisk (*) denotes an excited state. These nitrogen species, some of which are in an excited state and many of which are short-lived, are created during combustion and during a corona discharge. The addition of a relaxation species provided by this invention provides a favorable reaction pathway to reduce these nitrogen species to ensure that diatomic nitrogen ($N_2$) instead of $NO_x$ is formed by "relaxing" the excited energy state of the nitrogen species. The relaxation energy of the relaxation species is preferably matched to the excitation energy of the nitrogen species.

In a preferred embodiment, triatomic nitrogen ($N_3$) is used as a relaxation species. A high reaction rate is forming exclusively $N_2$ upon relaxation is achieved with a high frequency of molecular collision between the relaxation species and the excited nitrogen species, in addition to the matching of relaxation and excitation energies.

These and other features and advantages of the invention will be apparent to those skilled in the art from the following detailed description, taken together with the accompanying drawings, in which:

DETAILED DESCRIPTION OF THE INVENTION

The present invention concerns a method for reducing $NO_x$ by using a relaxation species. The relaxation species can be provided by a separate source. The corona discharge desired for pollutant treatment usually occurs at a high voltage level in the range of about 5–20 kV and a frequency in the range of about 5–15 MHz. In general, the voltage desired for the effective reduction of $NO_x$ is less than that desired for the oxidation of HC and CO. The corona discharge voltage for $NO_x$ reduction is preferably no more than 10 kV.

Figure 1:
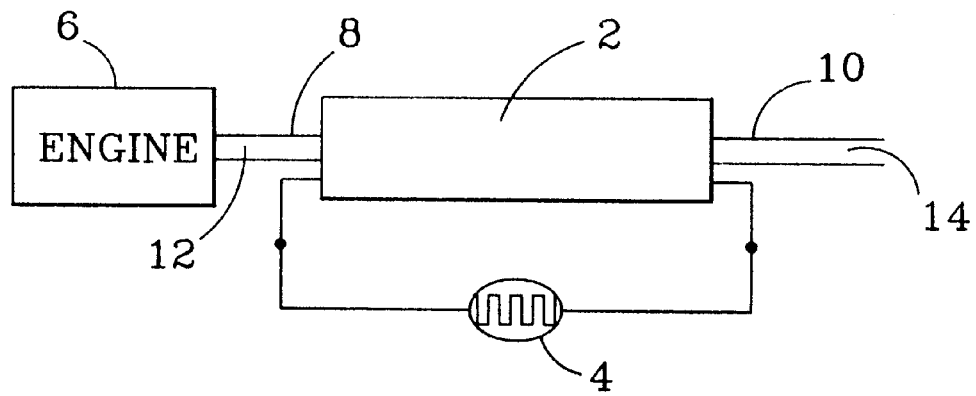
FIG. 1, described above, is a block diagram of a conventional self-resonant corona discharge pollutant destruction system.

The invention is applicable to the destruction of $NO_x$ in corona discharge pollutant destruction systems such as that shown in FIG. 1. The system may be equipped with multiple corona discharge reactors, each of which performs a dedicated function of either oxidizing high energy level pollutants such as HC and CO or reducing low energy level pollutants such as $NO_x$. The invention provides a relaxation species in a reactor that is dedicated to the reduction of $NO_x$.

Exhaust gas from an internal combustion engine typically is highly oxidizing in nature and includes highly reactive oxidizers such as ozone ($O_3$) as well as highly oxidizing free radicals such as hydroxyl radicals (OH) and partially oxidized hydrocarbon radicals. These oxidizing radicals are produced by the combustion of fuel with $O_2$ in the engine. When the exhaust gas passes through a corona discharge reactor, H and OH radicals and $O_3$ are also generated, thereby producing a strongly oxidizing environment in the exhaust gas. During combustion in the internal combustion engine and during a high-voltage corona discharge within the corona discharge reactor, nitrogen species are formed by the energy imparted to the gas molecules. These nitrogen species include N, NO, NO*, $NO_2$, $N_2O$, $NO_3$, $N_2O_5$, $HNO_2$, $HNO_3$, $HO_2NO_2$, RONO and $RONO_2$. The asterisk (*) denotes an excited state. Some of these various species are each in an excited high energy state, and many of them quickly react with other species and are short-lived. The excitation energy of each nitrogen species is also called the Arrhenius energy. The highly reactive oxidizers such as $O_3$ and radicals such as H, OH and partially oxidized hydrocarbon radicals produce significant reactions with the excited nitrogen species to generate $NO_x$, which includes, among other species, NO and $NO_2$.

The invention removes $NO_x$ by reducing the excitation energies of the nitrogen species. A relaxation species provided in this invention reduces the reactive energies within these nitrogen species and provides a favorable reaction pathway to ensure that any $NO_x$ is broken into diatomic nitrogen ($N_2$) and diatomic oxygen ($O_2$). After the formation of $N_2$, the encounter between $N_2$ and the oxidizing radicals will not produce $NO_x$. The relaxation energy, that is, the energy provided by the relaxation species to reduce $NO_x$, is preferably matched to the excitation energies of the nitrogen species, so that the excitation energies necessary for reactions with the oxidizing radicals to generate $NO_x$ are no longer present. In general, the relaxation species acts as a sink for absorbing the excitation energies of the nitrogen species.

In a preferred embodiment, triatomic nitrogen ($N_3$) is used as a relaxation species. $N_3$ can be provided separately, or by a corona discharge in a corona discharge reactor. In general, the exhaust gas generated by an internal combustion engine comprises about 80% diatomic nitrogen ($N_2$), which is about the same proportion as in the ambient air. The rate of reaction of forming exclusively $N_2$ upon relaxation of the excited nitrogen species depends on the frequency of molecular collisions between the relaxation species and the excited nitrogen species as well as the matching of relaxation and excitation energies. When the relaxation energy is released, $N_3$ is broken down into $N_2$ and N radicals, which break down NO to form N and O radicals. The N radicals from NO and N radicals from $N_3$ combine to form $N_2$, while the O radicals combine to form $O_2$. Both $N_2$ and $O_2$ are stable at the temperatures encountered in the reactor once they are formed, and do not react with each other again in the corona discharge reactor.

Figure 2:
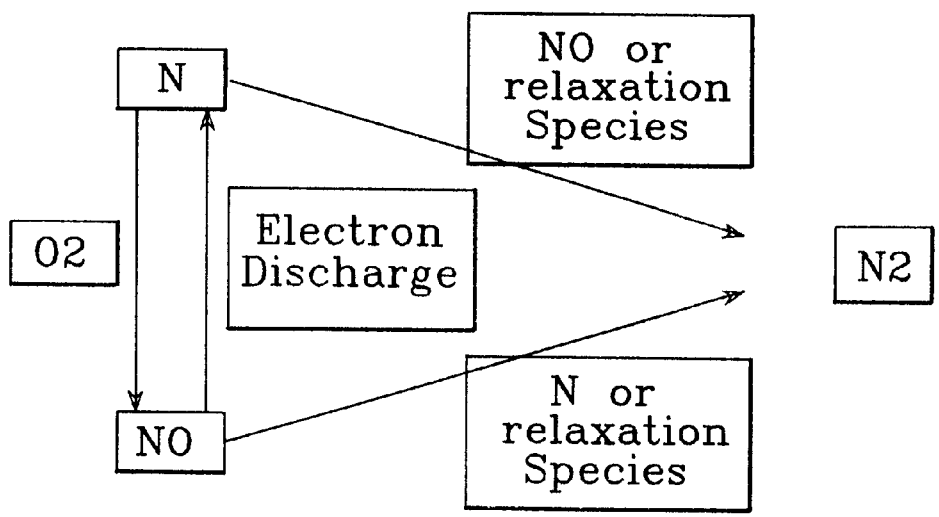
FIG. 2 is a reaction diagram of reducing $NO_x$ by a relaxation species in a corona discharge reactor.

FIG. 2 is a chemical reaction diagram that illustrates the use of a relaxation species combined with electron discharge in the presence of oxygen to transform the nitrogen species, in this case specifically N and NO radicals, into diatomic nitrogen ($N_2$). The N radical reacts with oxygen ($O_2$) to become the NO radical. The reverse reaction, which is the transformation of NO into N, occurs when NO is subjected to an electron discharge, which is preferably generated by a corona discharge at a desired voltage and frequency. When the NO radical or a relaxation species is applied to react with the N radical, or when the N radical or a relaxation species is applied to react with the NO radical, $N_2$ is formed. $N_2$ is not nearly as reactive as the N and NO radicals and is generally very stable at temperatures below the combustion temperature of an internal combustion engine. $N_2$ becomes reactive and forms $NO_x$ only in the presence of high temperature such as that expected in the combustion chamber of an internal combustion engine. The temperature in a corona discharge reactor chamber is generally not high enough to make $N_2$ reactive. Therefore, once $N_2$ molecules are formed, they will not be broken down again to form radicals that react with other species to form $NO_x$.

The present invention should be well suited for future automotive electronic catalytic converters which are expected to employ corona discharge pollutant destruction reactors to meet more stringent air quality standards. Because no relaxation species need to be provided separately in an automobile and no extra hardware is required to store and to transfer the species, savings in manufacturing and operating costs can be realized for automotive applications.

While one illustrative embodiment of the invention has been shown and described, numerous variations and alternate embodiments will occur to those skilled in the art. Such variations and alternate embodiments are contemplated, and can be made without departing from the spirit and scope of the invention as defined in the appended claims.

We claim:

1. A method of treating a pollutant gas, comprising:

subjecting said pollutant gas to a corona discharge to produce excited nitrogen species having associated excitation energies;

providing a relaxation species consisting essentially of triatomic nitrogen ($N_3$) to said pollutant gas during said corona discharge, said relaxation species characterized by a relaxation energy which matches said excitation energies of said nitrogen species; and reacting said excited nitrogen species with said relaxation species during said corona discharge so that said relaxation species reduces said excitation energies of said excited nitrogen species sufficiently to break down $NO_x$ molecules in the pollutant gas into $N_2$ and $O_2$ and to inhibit said $N_2$ from reacting with oxidizing radicals to generate $NO_x$.

2. The method of claim 1, wherein said relaxation species is generated by said corona discharge.

3. The method of claim 2, wherein said corona discharge is generated at a voltage in the range of 5–10 kV.

4. The method of claim 1 wherein said $N_3$ is generated by applying said corona discharge to said pollutant gas at a voltage in the range of 5–10 kV.

5. The method of claim 1, wherein said excited nitrogen species include N radicals and NO radicals that react with said relaxation species to form $N_2$.

6. A method of reducing $NO_x$ is a pollutant gas, comprising:

providing excited nitrogen species, produced by a corona discharge, said excited nitrogen species characterized by excitation energies and at least some oxidizing radicals in said pollutant gas;

providing a relaxation species characterized by a relaxation energy which matches said excitation energies of said excited nitrogen species; and applying said corona discharge to said pollutant gas to stimulate a reaction between said relaxation species and said excited nitrogen species wherein said relaxation species reduces said excitation energies of said nitrogen species sufficiently to form $N_2$ and to inhibit the generation of $No_x$.

7. The method of claim 6, wherein said relaxation species are generated by a corona discharge.

8. The method of claim 7, wherein said corona discharge is generated at a voltage in the range of 5–10 kV.

9. The method of claim 6, wherein said $N_3$ is generated by applying said corona discharge to said exhaust gas at a voltage in the range of 5–10 kV.

10. A method for forming diatomic nitrogen in a pollutant gas, comprising:

providing a nitrogen species, produced by a corona discharge, said nitrogen species having an excited energy state;

providing a relaxation species consisting essentially of triatomic nitrogen which is combined with said corona discharge in the presence of oxygen; and reacting said relaxation species and said nitrogen species such that the excited energy state of said nitrogen species is relaxed and diatomic nitrogen is formed.

11. The method of claim 10, wherein the nitrogen species and the relaxation species have matched energies.

12. The method of claim 10, wherein the nitrogen species and the relaxation species reduces the excited energy state of the nitrogen species sufficiently to form nitrogen dioxide and to inhibit the generation of the $NO_x$.

* * * * *